Dec. 10, 1935.     H. WOODROFFE     2,023,567

PIPE COUPLING SEAL

Filed Aug. 8, 1935

Harvey Woodroffe INVENTOR.

BY *Chas Lyon Russell* his ATTORNEY.

Patented Dec. 10, 1935

2,023,567

UNITED STATES PATENT OFFICE 2,023,567

PIPE COUPLING SEAL

Harvey Woodroffe, Philadelphia, Pa., assignor of one-third to James Stuart Lowe and one-third to Louis A. Levy, both of Wilmington, Del.

Application August 8, 1935, Serial No. 35,391

5 Claims. (Cl. 70—122)

This invention relates to an appliance for sealing pipe couplings against unauthorized opening and has for an object to provide an appliance of this character which is simple in construction, easy of application, efficient in operation, durable when applied but nevertheless frangible under the pressure of a wrench.

Another object of the invention is to provide a sealing device having a portion for being cemented to a pipe and another frangible portion which may be secured to a coupling nut on the pipe.

Another object of the invention is to provide a strip of frangible sheet material and a tape longer than the strip, threaded through a series of openings disposed longitudinally throughout the major portion thereof, one end of the tape being designed to be sealed to a pipe, the strip being designed to be wrapped about a coupling nut on the pipe and the other end of the tape being designed to be wrapped around the sealing strip and cemented in position.

Another object of the invention is to provide a sealing device having a tape adapted to be cemented to a pipe and a carrier for the tape adapted to be wrapped about and sealed to a coupling nut on the pipe.

One practicable embodiment of my invention and the mode for applying it are illustrated in the accompanying drawing in which.

Figure 1:
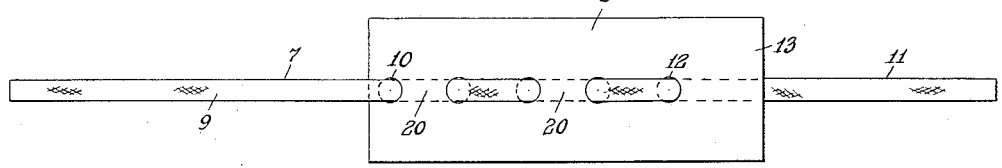
Figure 1 is a face view of the appliance.
Figure 2:
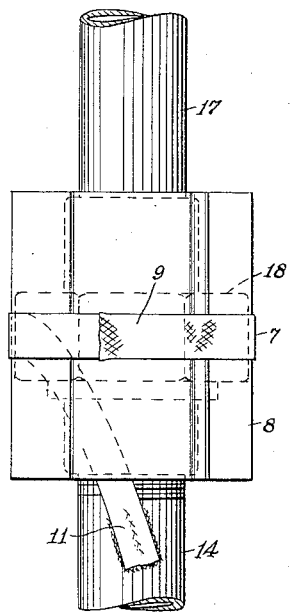
Figure 2 is a view showing in elevation, a pipe coupling with my improved appliance applied thereon.
Figure 4:
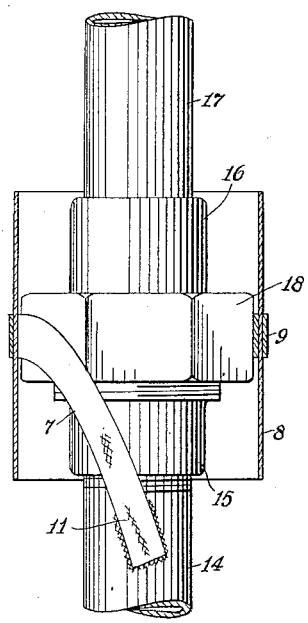
Figure 4 is a view somewhat similar to Figure 2 but showing illustrated appliance in longitudinal section.
Figure 3:
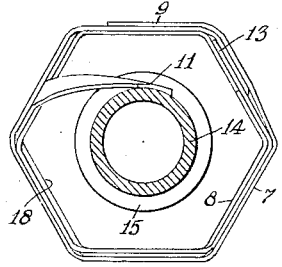
Figure 3 is a view looking upwardly at the parts shown in Figure 2.
Figure 5:
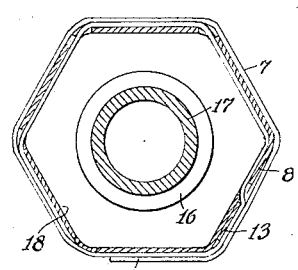
Figure 5 is a view showing the strip part of the device in cross section.

The preferred form of my invention comprises a piece of tape 7 carried by a strip of frangible sheet material 8, which in some respects is tough and in other respects might be called frangible because it is intended that it shall split or tear upon the application of a wrench to it when wrapped about a nut, as for instance a coupling nut illustrated herein.

The tape 7 is shown threaded longitudinally throughout the major portion of the strip 8; in the present instance is passing through a series of holes disposed longitudinally throughout the strip. I find it more convenient for the application of the device to have an odd number of holes so that one end of the tape will be at one side of the strip and the other end at the other side. In the present illustration the end 9 of the tape is shown extending from one face of the strip through the hole 10 and the other end 11 of the tape extending from the other side of the strip through the hole 12. For purposes presently to be described I prefer to have the opening 12 somewhat further in from the end of the strip than is the opening 10, so that there will be an appreciable portion 13 of the strip beyond the point where the end 11 of the tape extends from it.

As a convenient means for illustrating the use of this appliance, I have shown a broken away piece of pipe 14, which may be assumed to be a pipe leading into a meter as for instance a gas meter. At the upper end of this pipe is shown one member 15 of a coupling, which by means of another member 16, carried by the pipe 17, are held together by means of a coupling nut 18.

After the coupling parts have been clamped together by means of the coupling nut 18, the operator places the end 13 of the strip 8 against the coupling nut, the face shown in Figure 1 being toward the operator and the opposite face against the nut. He then brings the tape down past the coupling member 15 and cements it to the pipe 14, preferably just below the screw thread. He then wraps the strip around the coupling nut, lapping the end 19 over the end 13 and then proceeds to wrap the end 9 of the tape around the strip and about the portions of the tape which extend through it. This tape is then cemented in position. The operator may, if he desires, apply cement to the tape where it extends through the strip at the regions marked 20 and which are in engagement with the nut. With the appliance thus in position, it will be impossible for an unauthorized person to uncouple the pipes 14 and 17. It will be impossible to turn the nut in either direction without tearing the end of the tape 11 loose from the pipe 14 and owing to the frangible character of the strip 8, it will be impossible to apply a wrench for the purpose of loosening the nut without leaving marks which will show that a wrench has been applied to the nut.

It is to be understood that changes may be made in this appliance within the scope of the claims without departing from the spirit of my invention.

Having thus described my invention, I claim and desire to secure by Letters Patent:

1. A sealing appliance, comprising a strip of frangible sheet material designed to be wrapped around a coupling nut and a tape longer than the strip and threaded longitudinally through the major portion thereof and located in part at least, on the side thereof intended to be outwardly of the nut, one end of the tape passing through the strip to the other side inwardly of its end, this end of the tape being designed to be cemented to a pipe carrying a coupling nut, about which the frangible strip may be wrapped.

2. A sealing appliance, comprising a strip of frangible sheet material designed to be wrapped around a coupling nut and a tape longer than the strip and threaded longitudinally through the major portion thereof and located in part at least, on the side thereof intended to be outwardly of the nut, one end of the tape passing through the strip to the other side inwardly of its end, this end of the tape being designed to be cemented to a pipe carrying a coupling nut, about which the frangible strip may be wrapped, the other end of the tape extending from the other end of the strip and being designed to be wrapped around the strip and cemented in position.

3. A sealing appliance, comprising a strip of frangible sheet material designed to be wrapped around a coupling nut, and a tape longer than the strip and having a portion disposed longitudinally throughout the major portion of the strip and located in part at least, on the side thereof intended to be outwardly of the nut, one end of the tape passing through the strip to the other side at an appreciable distance from one end, this end of the tape being designed to be cemented to a pipe carrying a coupling nut, about which the frangible strip may be wrapped.

4. A sealing appliance, comprising a strip of frangible sheet material designed to be wrapped around a coupling nut, and a tape longer than the strip and having a portion disposed longitudinally throughout the major portion of the strip and located in part at least, on the side thereof intended to be outwardly of the nut, one end of the tape passing through the strip to the other side at an appreciable distance from one end, this end of the tape being designed to be cemented to a pipe carrying a coupling nut, about which the frangible strip may be wrapped, the other end of the tape extending from the other end of the strip and being designed to be wrapped around the strip and cemented in position.

5. A sealing appliance, comprising a strip of frangible sheet material designed to be wrapped around a coupling nut, and a tape longer than the strip and having a portion disposed longitudinally throughout the major portion of the strip and located in part at least, on the side thereof intended to be outwardly of the nut, one end of the tape extending from the strip at the other side inwardly of its end, this end of the tape being designed to be cemented to a pipe carrying a coupling nut to which the frangible strip may be secured.

HARVEY WOODROFFE.